Patented Sept. 18, 1928.

1,685,071

UNITED STATES PATENT OFFICE.

HUGO SCHWEITZER, OF WIESDORF, NEAR COLOGNE, AND WILHELM NEELMEIER, OF LEVERKUSEN, NEAR COLOGNE, GERMANY, ASSIGNORS TO GRASSELLI DYESTUFF CORPORATION, OF NEW YORK, N. Y., A CORPORATION OF DELAWARE.

AMINODIARYLSULPHONPYRAZOLONE AZODYESTUFFS.

No Drawing. Application filed January 5, 1926, Serial No. 79,476, and in Germany January 8, 1925.

This invention relates to new azodyestuffs prepared from the pyrazolones of aminodiarysulphones and their derivatives, such as sulphonic acid, carboxylic acids, hydroxycarboxylic acids, etc. Such pyrazolones have not been used heretofore for the preparation of azodyestuffs.

We have found that the azodyestuffs obtainable from them have far superior fastness properties than those made from known pyrazolones.

They give yellow shades on wool which with respect to the properties of fastness to fulling, perspiration, and level dyeing, as well as unusual fastness to light, are not obtainable with pyrazolone dyestuffs heretofore known. The same is true of their use as lake dyestuffs. In the latter case, one obtains yellow, water soluble dyestuffs which are fast to lime and water when made up as distemper paints and which show an extraordinary fastness to light. These pyrazolones are also suitable as coupling components in the formation of chrome mordant dyestuffs or wool, especially those which contain an o-hydroxycarboxylic acid residue. With these products, one obtains wool dyestuffs which give very fast greenish yellows and also red tints that are fast to potting.

Example 1.

173 parts by weight of o-sulphanilic acid are diazotized in the usual way and coupled in the presence of sodium acetate with 408 parts by weight of the methylpyrazolone as is obtained from 4'-methyl-2-aminodiphenyl-sulphone-4-sulphonic acid. After completion of the coupling reaction, the dyestuff is salted out, pressed and dried. It dyes wool a level greenish-yellow of excellent fastness to fulling and perspiration as well as extraordinary fastness to light. It probably has the following constitutional formula:

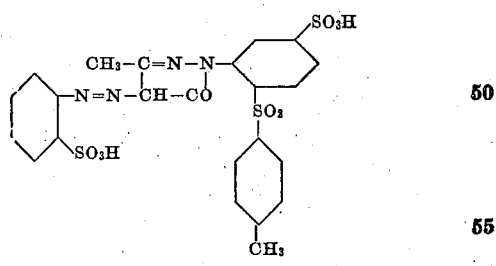

The pyrazolone is obtained by reduction of the condensation product of 4-toluol-1-sulphinic acid and 2-nitro-1-chlorbenzol-4-sulphonic acid, conversion of the amine so obtained into the hydrazine by the well known methods and conversion of the latter into the pyrazolone by means of acetoacetic ester. The pyrazolone is produced according to the following graphical formulæ:

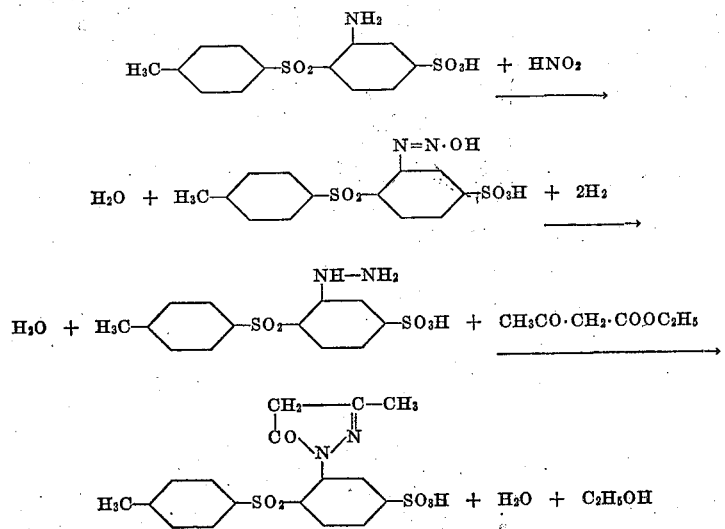

It is a colorless powder which dissolves easily in alkali and with more difficulty in aqueous sodium acetate solution and which combines with diazocompounds to yield dyestuffs.

If p-sulphanilic acid is used in place of o-sulphanilic acid, a somewhat redder dyestuff is obtained possessing similar characteristics.

Example 2.

107 parts by weight of o-toluidine are diazotized and coupled in the presence of sodium acetate with 408 parts by weight of the methylpyrazoline obtained from 4'-methyl-2-aminodiphenylsulphone-4-sulphonic acid. The dyestuff is worked up in the usual way. Its characteristics are about those of the product of Example 1. It probably has the formula:

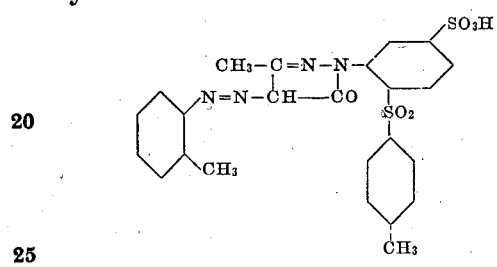

Example 3.

327 parts by weight of 4'-methyl-2-animodiphenylsulphone-4-sulphonic acid are diazotized and coupled in the presence of sodium acetate with 430 parts by weight of pyrazolone carboxylic acid obtained from 4'-methyl-2-aminodiphenylsulphone-4-sulphonic acid. The dyestuff is salted out, isolated and dried. In distemper paints it dyes a greenish yellow. It probably has the formula:

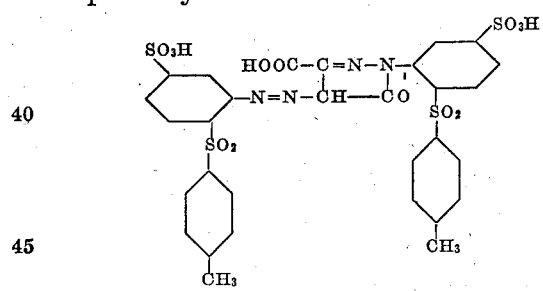

The color is fast to lime and water and very fast to light.

The pyrazolone carboxylic acid is obtained from oxalacetic ester and the hydrazine of 4'-methyl-2-aminodiphenylsulphone-4-sulphonic acid of Example 1. It is a colorless powder which dissolves easily in alkali and aqueous sodium acetate solution. It yields dyestuffs by coupling with diazo compounds.

If 4'-methyl-2-aminodiphenylsulphone obtainable by reduction of the condensation product of 4-toluol-1-sulphinic acid and 2-nitro-1-chlorbenzol, is used in place of the 4'-methyl-2-aminodiphenylsulphone-4-sulphonic acid, a dyestuff of similar characteristics is produced.

The methylphrazolone obtained from 4'-methyl-2-aminodiphenylsulphone is a colorless crystalline powder melting at 178-180°.

Example 4.

171.5 parts by weight of 4-chlor-2-nitraniline are diazotized and coupled in the absence of sodium acetate with 408 parts by weight of the pyrazolone of Example 1. The dyestuff is worked up in the usual manner. In distemper paints it dyes a reddish yellow, fast to lime and very fast to light. It probably has the formula:

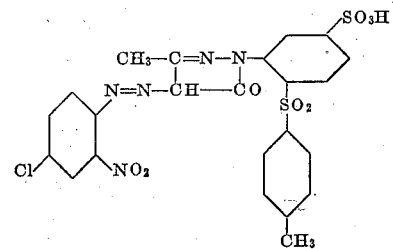

Example 5.

327 parts by weight of 4'-methyl-2-aminodiphenylsulphone-4-sulphonic acid are diazotized and coupled in the presence of sodium acetate with 430 parts by weight of the pyrazolone carboxylic acid obtained from 4'-methyl - 4 - aminodiphenylsulphone - 2 - sulphonic acid. The dyestuff is salted out and worked up in the usual manner. It probably has the formula:

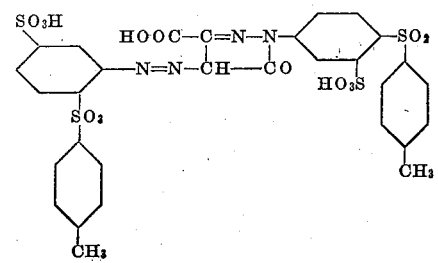

In distemper paints it dyes a greenish yellow. Its characteristics of fastness are about those of the product of Example 3.

The pyrazolone carboxylic acid is obtained by reduction of the condensation product of 4-toluol-1-sulphinic acid and 4-nitro-1-chlorbenzol-2-sulphonic acid, conversion of the amine so obtained by the well known methods into the hydrazine and conversion of the latter into the pyrazolone carboxylic acid by means of oxalacetic ester. It is a colorless powder which dissolves easily in alkali and aqueous sodium acetate solution and which yields dyestuffs by combining with diazocompounds.

Example 6.

173 parts by weight of o-sulphanilic acid are diazotized and coupled in the presence of sodium acetate with 474 parts by weight of the pyrazolone obtained from 2-amino-4'-hydroxydiphenylsulphone - 4 - 3'-sulphocarboxylic acid. The dyestuff is worked up in the well known manner. It dyes wool a greenish yellow which when afterchromed becomes very fast without any real change of shade. It probably has the formula:

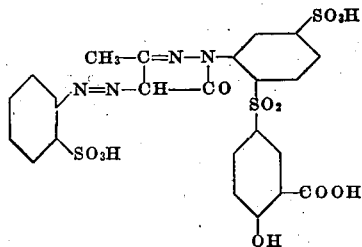

The 2-amino-4'-hydroxydiphenylsulphone-4.3'-sulphocarboxylic acid is obtained by reduction of the condensation product of salicylsulphinic acid and 2-nitro-1-chlorbenzol-4-sulphonic acid. The methylpyrazolone from the 2-amino-4'-hydroxydiphenylsulphone-4-3'-sulphocarboxylic acid is a colorless powder which dissolves easily in alkali and aqueous sodium acetate solution. It combines with diazocompounds to form mordant dyestuffs. If the o-sulphanilic acid of this example is replaced by p-sulphanilic acid or by o-toluidine, products of similar characteristics are obtained.

*Example 7.*

143.5 parts by weight of 4-chlor-2-aminophenol are diazotized and coupled in a sodium hydroxide solution with the pyrazolone of Example 6. The dyestuff is worked up in the usual way and dyes wool orange shades which when afterchromed are changed to a fast red. The color is fast to potting. The dyestuff probably has the formula:

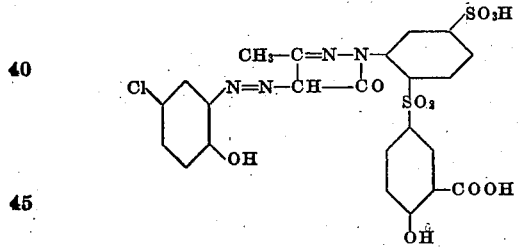

The products made according to this invention are yellow to orange powders which when dissolved in sulphuric acid gives solutions of the same colors as their dyeings. In the claims the term "pyrazolone of an amino-diarylsulphone" is intended to include the compounds of the general formula:

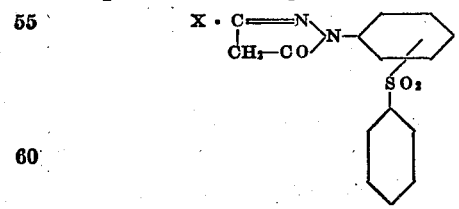

wherein X stands for hydrogen, an alkyl group or a carboxylic acid group and wherein the benzene nuclei may be substituted or not. As is apparent from the description the benzene nuclei may contain as substituents, for example, sulphonic acid, carboxylic acid; hydroxycarboxylic acid or acidyl amino groups.

We claim:

1. As new products, azodyestuffs which consist of the reaction product obtainable by coupling an aromatic diazocompound and a pyrazolone of an aminodiarylsulphone.

2. As new products, azodyestuffs, which consist of the product obtainable by coupling an aromatic diazocompound with a methyl pyrazolone of an aminodiarylsulphone.

3. As a new product the azo dyestuff consisting of the product obtainable by coupling an aromatic diazo compound with a pyrazolone of a sulphonated aminodiarylsulphone.

4. As a new product the azo dyestuff consisting of the product obtainable by coupling a sulphonated aromatic diazo compound with a pyrazolone of a sulphonated aminodiarylsulphone.

5. As a new product the azodyestuff having in the free state most probably the general formula

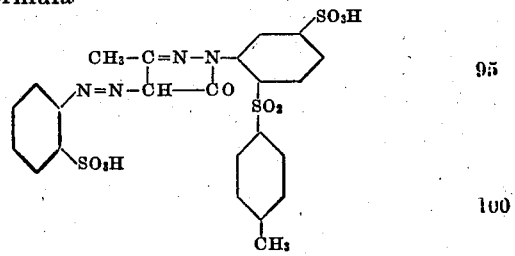

which is a yellow powder, soluble in water, soluble in concentrated sulphuric with a yellow color, and dyeing wool from an acid bath greenish-yellow shades of excellent fastness to light, fulling and perspiration.

6. As new products, the azodyestuffs which are obtainable by coupling an aromatic diazo compound with a methyl pyrazolone of a sulphonated amino-diarylsulphone.

7. As new products, the azodyestuffs which are obtainable by coupling a sulphonated aromatic diazo compound with a pyrazolone of an amino-diarylsulphone.

8. As new products, the azodyestuffs which are obtainable by coupling a sulphonated aromatic diazo compound with a methyl pyrazolone of an amino-diarylsulphone.

9. As new products, the azodyestuffs which are obtainable by coupling a sulphonated aromatic diazo compound with a methyl pyrazolone of a sulphonated amino-diarylsulphone.

10. As new products, the azodyestuffs having in the free state the formula:

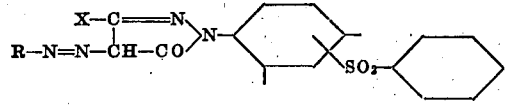

in which R stands for an aromatic group, X stands for hydrogen, an alkyl group or a carbozylic acid group, in which the —SO₂— 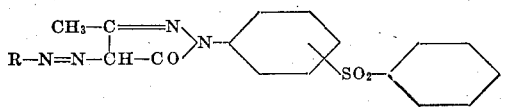 substituent is in either the 2- or 4-position to the nitrogen, and in which the benzene nuclei attached to the sulphone group may be further substituted.

11. As new products, the azodyestuffs having in the free state the formula:

in which R stands for an aromatic group in which the —SO₂— 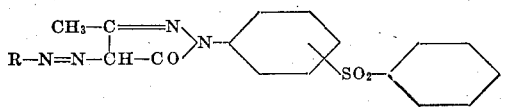 substituent is in either the 2- or 4-position to the nitrogen, and in which the benzene nuclei attached to the sulphone group may be further substituted.

12. As new products, the azodyestuffs having in the free state the formula:

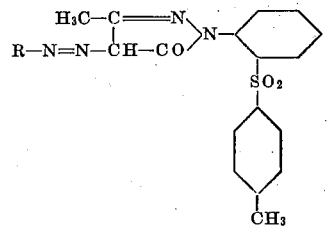

in which R stands for an aromatic group and in which the benzene nuclei attached to the sulphone group may be further substituted.

In testimony whereof, we affix our signatures.

HUGO SCHWEITZER.
WILHELM NEELMEIER.